US009788680B1

(12) United States Patent
Giugliano

(10) Patent No.: US 9,788,680 B1
(45) Date of Patent: Oct. 17, 2017

(54) COOKWARE IMMERSION DEVICE

(71) Applicant: John Giugliano, East Meadow, NY (US)

(72) Inventor: John Giugliano, East Meadow, NY (US)

(*) Notice: Subject to any disclaimer, the term of this patent is extended or adjusted under 35 U.S.C. 154(b) by 3 days.

(21) Appl. No.: 14/836,747

(22) Filed: Aug. 26, 2015

(51) Int. Cl.
*A47J 37/06* (2006.01)
*A47J 27/08* (2006.01)

(52) U.S. Cl.
CPC ................. *A47J 27/0804* (2013.01)

(58) Field of Classification Search
CPC ............. B65D 39/02; B65D 43/022; B65D 2543/00092; B65D 2543/00314
USPC ......... 99/275, 279, 287, 306, 340; 220/233, 220/578, 580; 426/433, 435
See application file for complete search history.

(56) References Cited

U.S. PATENT DOCUMENTS

| | | | | |
|---|---|---|---|---|
| 2,667,117 A | * | 1/1954 | Millard | A47J 36/20 16/425 |
| 2,900,896 A | * | 8/1959 | Bondanini | A47G 19/14 210/359 |
| 3,987,941 A | * | 10/1976 | Blessing | A47J 36/06 220/578 |
| 4,138,939 A | * | 2/1979 | Feld | A47J 43/24 99/418 |
| 4,718,188 A | * | 1/1988 | Roberts | A01K 97/01 294/14 |
| 4,723,674 A | * | 2/1988 | Nunes | B65D 39/02 215/231 |
| 4,953,452 A | * | 9/1990 | Tarlow | A47J 36/20 116/221 |
| 5,117,998 A | * | 6/1992 | Handzel | B67D 7/0227 220/578 |
| 5,219,091 A | * | 6/1993 | Paramski | B65D 83/0044 220/580 |
| 5,349,898 A | * | 9/1994 | Po Wo Cheung | A47J 36/20 126/369 |
| 5,486,028 A | * | 1/1996 | Swain | B66C 1/54 294/100 |
| D421,555 S | * | 3/2000 | Duhamel | D7/665 |
| 6,758,131 B1 | * | 7/2004 | Joubert | A47J 36/06 220/573.1 |
| 8,960,475 B1 | * | 2/2015 | Peters | B65D 53/00 220/212.5 |
| 2006/0180591 A1 | * | 8/2006 | Porter | B65D 39/02 220/580 |

* cited by examiner

*Primary Examiner* — Thien S Tran
(74) *Attorney, Agent, or Firm* — Michael I. Kroll; Edwin D. Schindler

(57) ABSTRACT

A cookware immersion device used in conjunction with a cooking pot having an upstanding wall thereabout with an open top to receive cooking liquid and food items therein. The device comprises a structure inserted within the open top of the cooking pot to press the food items down within the cooking fluid. A mechanism is for locking the structure in place against an inner surface of the wall of the cooking pot, so as to retain all of the food items within the cooking liquid in the cooking pot.

5 Claims, 11 Drawing Sheets

COOKWARE IMMERSION DEVICE

BACKGROUND OF THE INVENTION

Field of the Invention

The present invention relates generally to cookware and, more specifically, to a cooking immersion device for holding food under a liquid within cookware during a cooking session.

Description of the Prior Art

There are other devices which provide for submerging food articles during cooking. While these devices may be suitable for the purposes for which they where designed, they would not be as suitable for the purposes of the present invention as heretofore described.

It is thus desirable to provide a cooking aid selectively positionable within cookware having a handle for extending/retracting blade-like elements from a stored position to an extended cookware engaging position thereby holding one or more food article(s) submerged in a cookware fluid during a cooking session, when finished the blades are retracted to their stored position and the device is removed.

SUMMARY OF THE PRESENT INVENTION

A primary object of the present invention is to provide a cookware immersion device that will submerge and hold articles of food below a liquid level within said cookware.

Another object of the present invention is to provide an immersion device for submerging an article in a container below the surface of a liquid medium within said container.

Yet another object of the present invention is to provide an immersion device that will keep food submerged in a cooking fluid during a cooking session.

Still yet another object of the present invention is to provide an immersion device having a base plate with a plurality of vertically depending base-plate posts fixedly attached to the base plate with the posts fixedly arrayed about and attached to a post collar with said base plate, posts and collar forming static structure for selectively extending a plurality of expansion plates until engaging the interior wall of a container, such as cookware.

An additional object of the present invention is to provide an immersion device having a drive plate post with a handle on the top end and a drive plate fastened to the bottom end with the drive plate post passing through said post collar and rotatable therein.

A further object of the present invention is to provide an immersion device wherein said drive plate has a plurality of drive plate linkages pivotally attached to the drive plate on one end and fixedly attached to a corresponding number of extension plates whereby rotation of the drive plate post via said post handle drives said expansion plates, during use, between a stored positioned to a deployed position to a stored position as desired.

Still yet another object of the present invention is to provide an immersion device having a plurality of guide pins fixedly attached to the base plate then extending into a respective plate-linkage longitudinal slot defining a path for extending and retracting the plurality of expansion plates via the drive plate post handle.

A further object of the present invention is to provide an immersion device having an immersion device handle manufactured from a heat dissipating material fixedly attached to one or more of the plurality of base-plate posts for ease of use.

A yet further object of the present invention is to provide an immersion device further providing a latching mechanism comprising a gear fixedly fastened to one or more drive plate post(s) and a leaf-spring like band extending from a base-post into arcuate engagement with said gear so that when extending the expansion plates the leaf-spring slips from one gear tooth to another during clockwise rotation while preventing counterclockwise rotation (returning the expansion plates to a stored position) until the spring is depressed allowing counter clockwise rotation.

A still yet further object of the present invention is to provide an immersion device further providing alignment nubs fixedly positioned approximate the leading edge of a respective expansion plate providing means for frictionally engaging the cookware interior wall in concert with said latching mechanism and aiding in extending all plates in a preferably horizontal position.

Additional objects of the present invention will appear as the description proceeds.

The present invention overcomes the shortcomings of the prior art by providing a cookware immersion device having an immersion device and extendable/retractable blade-like elements that frictionally engage the interior wall of the cookware while holding one or more food article submerged in a fluid during a cooking session.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
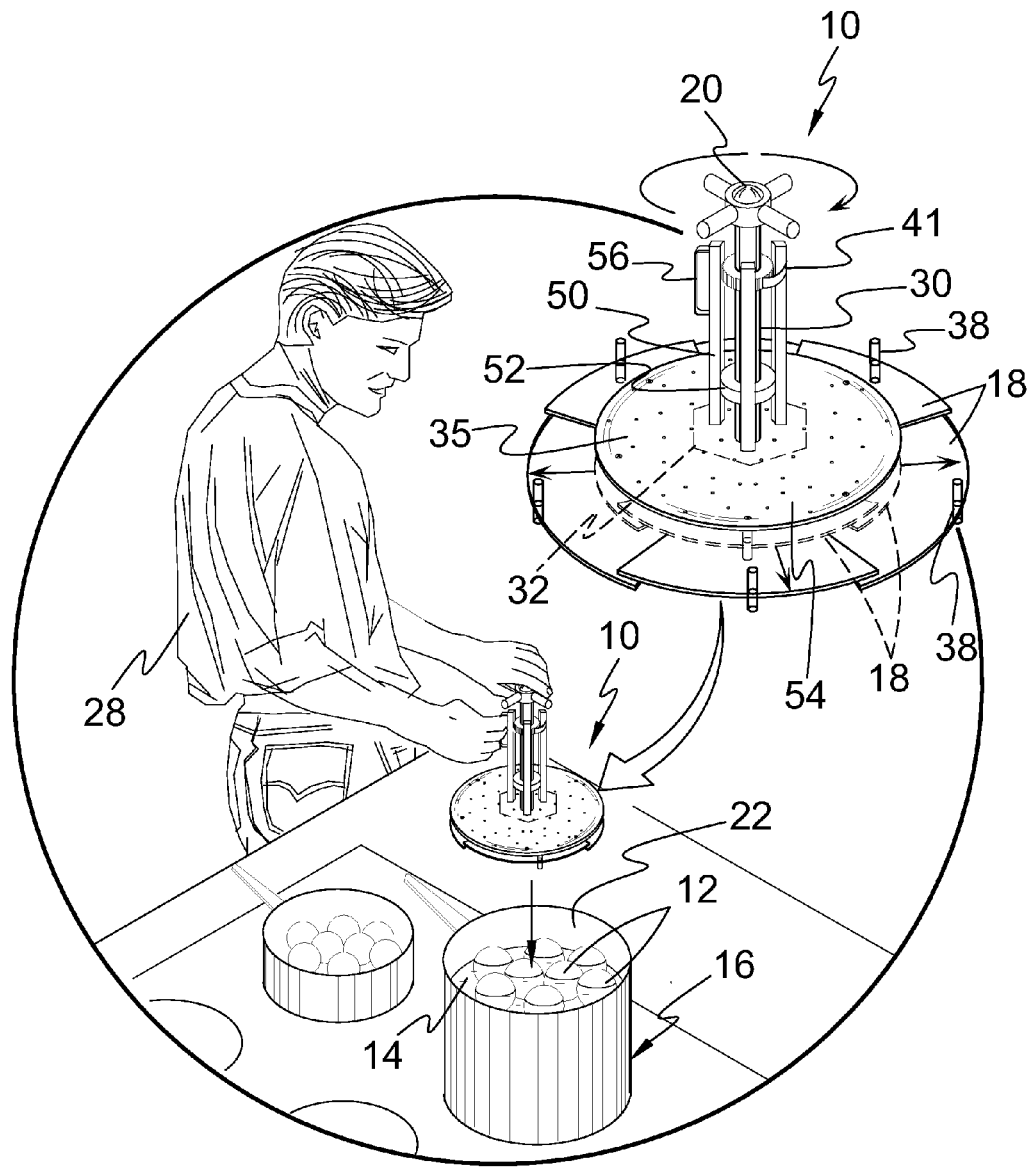
FIG. 1 is an illustrative view of the cookware immersion device.

Turning now descriptively to the drawings, in which similar reference characters denote similar elements throughout the several views, the figures illustrate a cookware immersion device of the present invention. With regard to the reference numerals used, the following numbering is used throughout the various drawing figures.

10 cookware immersion device
12 food item
14 liquid
16 cooking pot
18 expansion plate of device 10
20 handle of device 10
22 inner wall of cooking pot 16
24 drive plate linkage of device 10
26 fastener of device 10
28 user
30 drive plate post of device 10
32 drive plate of device 10
34 guide pin of device 10
35 base plate of device 10
36 longitudinal slot in linkage 24
38 alignment nub of device 10
40 leaf spring of latching mechanism 41
41 latch mechanism of device 10
42 fastened end of leaf spring 40
44 free end of leaf spring 40
46 gear of device 10
50 base post of device 10
52 bearing of device 10
54 aperture in base plate 35
56 hand grip of device 10

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the cookware immersion device. The present invention is a cookware immersion device 10 used to submerge food items 12 within a liquid 14 in a cooking pot 16. The device 10 comprises a plurality of expansion plates 18, so that when positioned within the cooking pot 16 the plates 18 can be extended by turning a provided handle 20 until the plates 18 frictionally engage an inner wall 22 of the cooking pot 16, thereby keeping the food items 12 submerged within the cooking fluid 14.

Figure 2A:
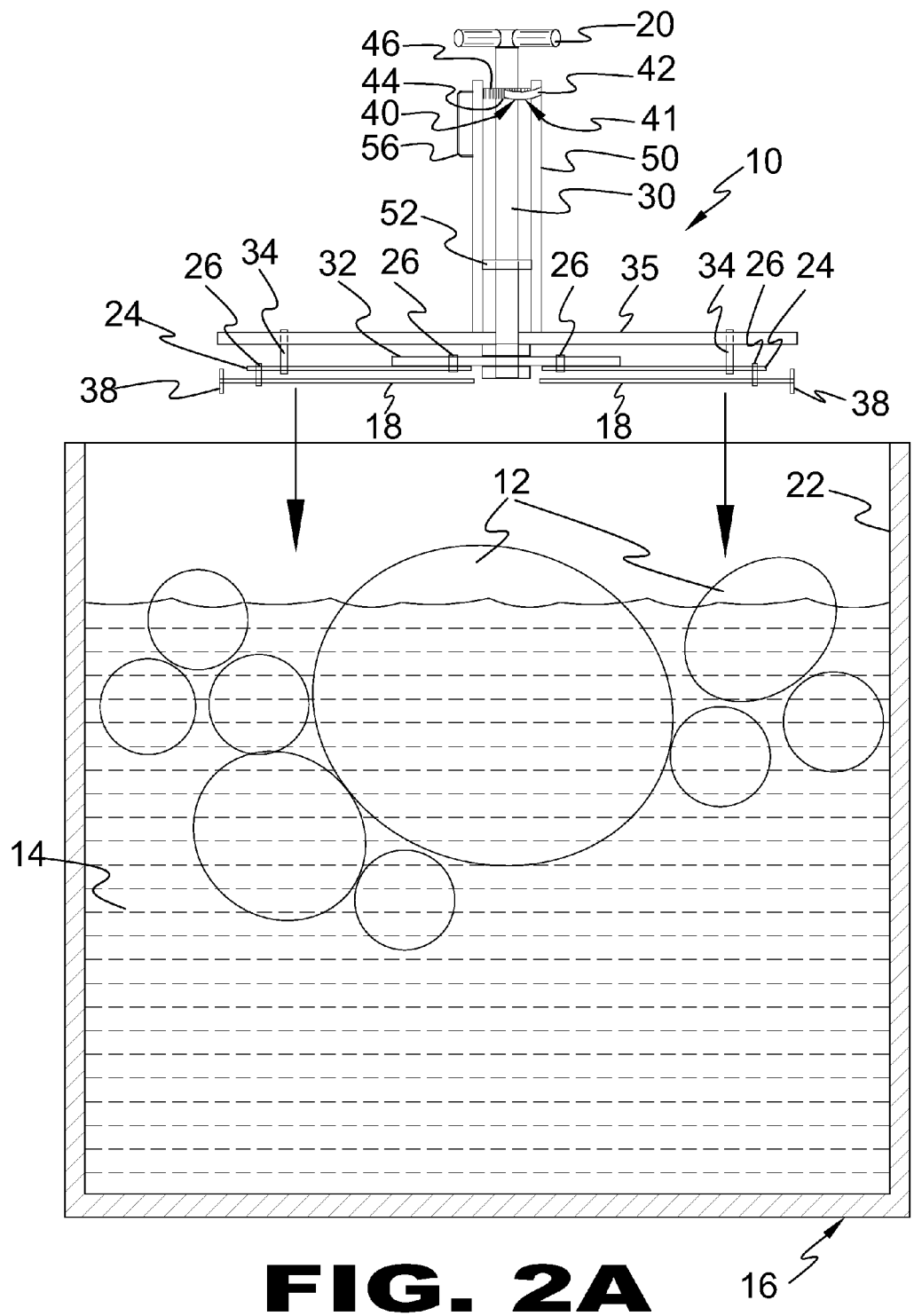
FIG. 2A is an illustrative view of the cookware immersion device positioned for use.

Referring to FIG. 2A, shown is an illustrative view of the cookware immersion device positioned for use. For clarity of operation a number of expansion plates 18, drive plate linkages 24 and associated fasteners 26 have been removed. In operation, the device 10 is positioned over the pot 16 where a user 28 desires to keep the food items 12 immersed in the liquid 14, whether for marinating or cooking. The immersion device 10 has a plurality of overlapping petal-like expansion plates 18 that are driven outwardly through rotation of the drive plate post handle 20. A drive plate post 30 is fixedly attached to a drive plate 32 that has a corresponding number of drive plate linkages 24 and expansion plates 18.

Figure 2B:
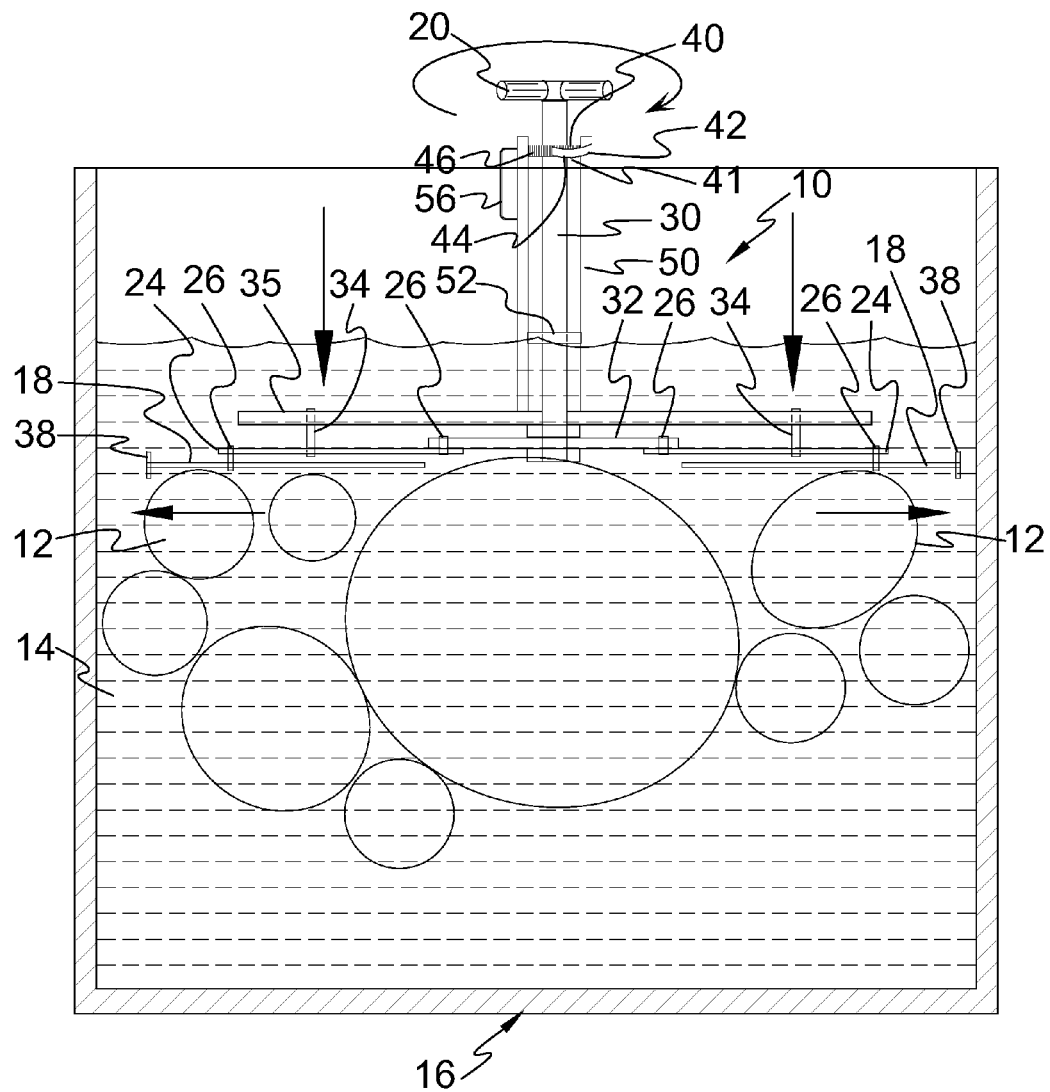
FIG. 2B is another illustrative view of the cookware immersion device positioned for use.

Referring to FIG. 2B, shown is another illustrative view of the cookware immersion device positioned for use. As aforementioned, the device 10 is positioned over the pot 16 where the user 28 desires to keep the food items 12 immersed in the liquid 14 whether for marinating or cooking. Clockwise rotation of the drive plate post handle 20 rotates the drive plate 32 and drive plate linkages 24 fastened thereto that are each fixedly attached to a respective expansion plate 18. The vectored path of each respective linkage 24 is determined by a guide pin 34 fixedly attached to a base plate 35 then extending through a provided longitudinal slot 36 in the linkage 24. As illustrated, the expansion plates 18 are partially extended to cover the food items 12 to be immersed, then inserted to keep the food items 12 below the top level of the liquid 14.

Figure 2C:
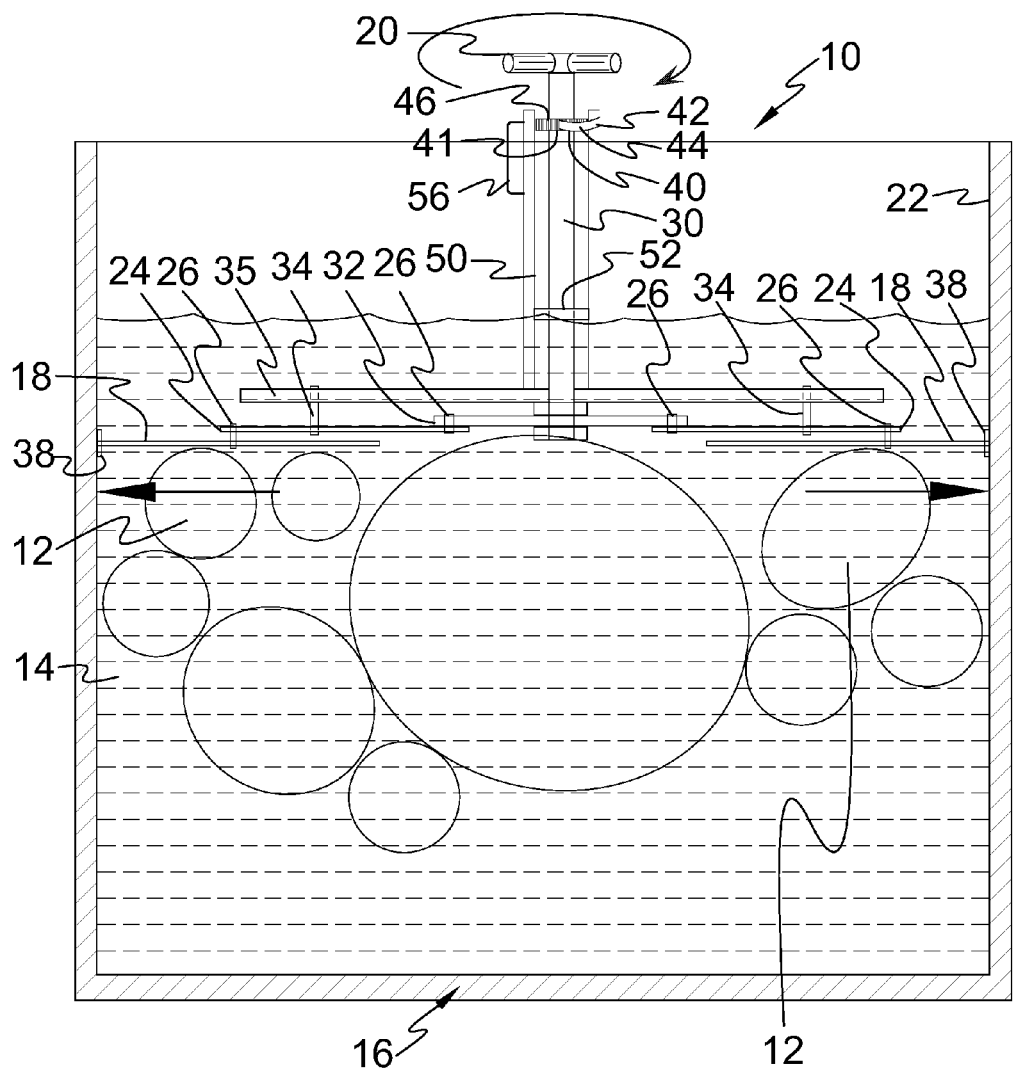
FIG. 2C is another illustrative view of the cookware immersion device in use.

Referring to FIG. 2C, shown is another illustrative view of the cookware immersion device in use. Once the immersion device 10 has the required food items 12 submerged within the liquid 14 being either water, oil, broth, or stock for marinating or cooking. The drive plate post handle 20 is rotated until alignment nubs 38 of the expansion plates 18 engage the inner wall 22 of the cooking pot 16. A leaf spring 40 of a latching mechanism 41 has a first fastened end 42 and a second free end 44 that slides over teeth of a gear 46 in clockwise rotation of the handle 20 with the second free end 44 of the leaf spring 40 because of its arcuate shape portion prevents counter clockwise rotation until pressure is placed on the arcuate shape portion that will dislodge the leaf spring 40 from the gear 46, whereby counter clockwise rotation of the handle 20 will move the expansion plates 18 and drive plate linkages 24 by virtue of the guide pins 34 back to their stored position.

Figure 3:
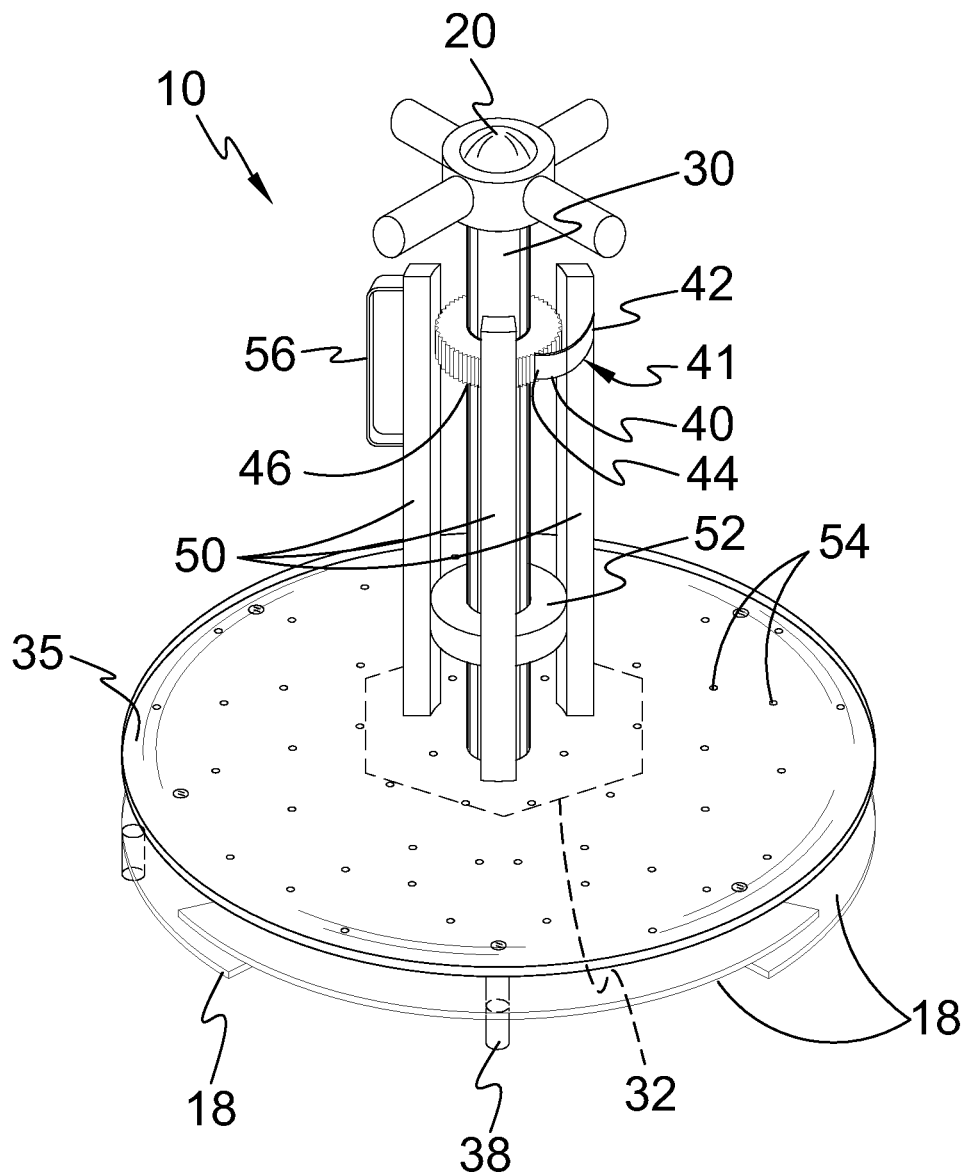
FIG. 3 is a perspective view of the cookware immersion device in the closed position.

Referring to FIG. 3, shown is a perspective view of the cookware immersion device in the closed position. The immersion device 10 comprises the base plate 35 having base posts 50 and a bearing 52 supporting the drive plate post 30 having the handle 20 on one distal end of the drive plate 32 and a drive plate 32, on the other end having linkage 24 for extending and retracting the expansion plates 18 through the handle 20. The base plate 35 has a plurality of apertures 54 for liquid 14 to pass through while keeping the food items 12 submerged within the liquid 14. One of the base posts 50 also has a hand grip 56 to help guide the device 10 into the cooking pot 16.

Figure 4:
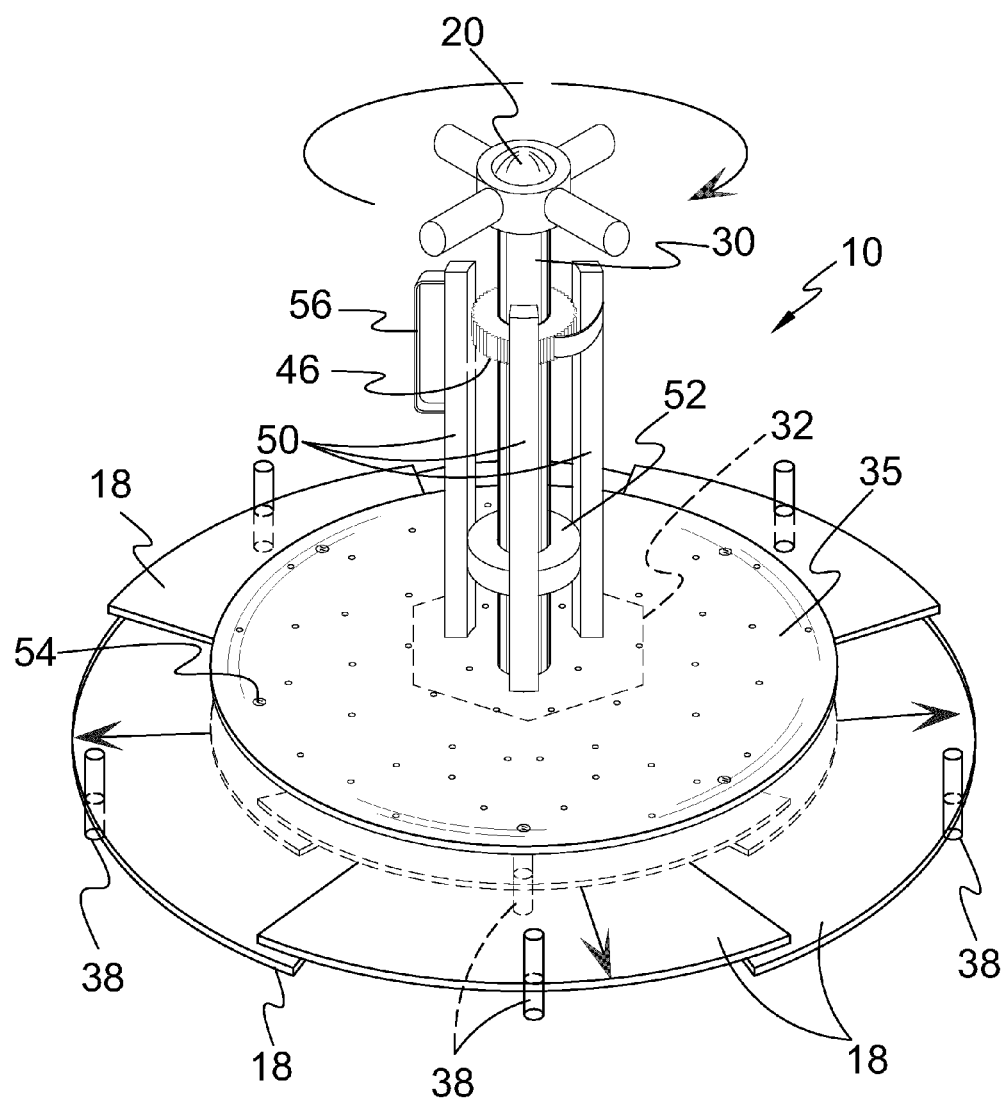
FIG. 4 is a perspective view of the cookware immersion device in the open position.

Referring to FIG. 4, shown is a perspective view of the cookware immersion device in the open position. The immersion device 10 comprises the base plate 35 having base posts 50 and bearing 52 supporting the drive plate post 30 having the handle 20 on one distal end and a drive plate 32 on the other end with linkage 24 for extending and retracting the expansion plates 18 through rotation of the handle 20. The latching mechanism 41 keeps the plates 18 in the desired extended position. To retract the plates 18 pressure is applied to the latching mechanism 41 which will disengage from the gear 46 allowing the handle 20 to be used to retract the plates 18.

Figure 5:
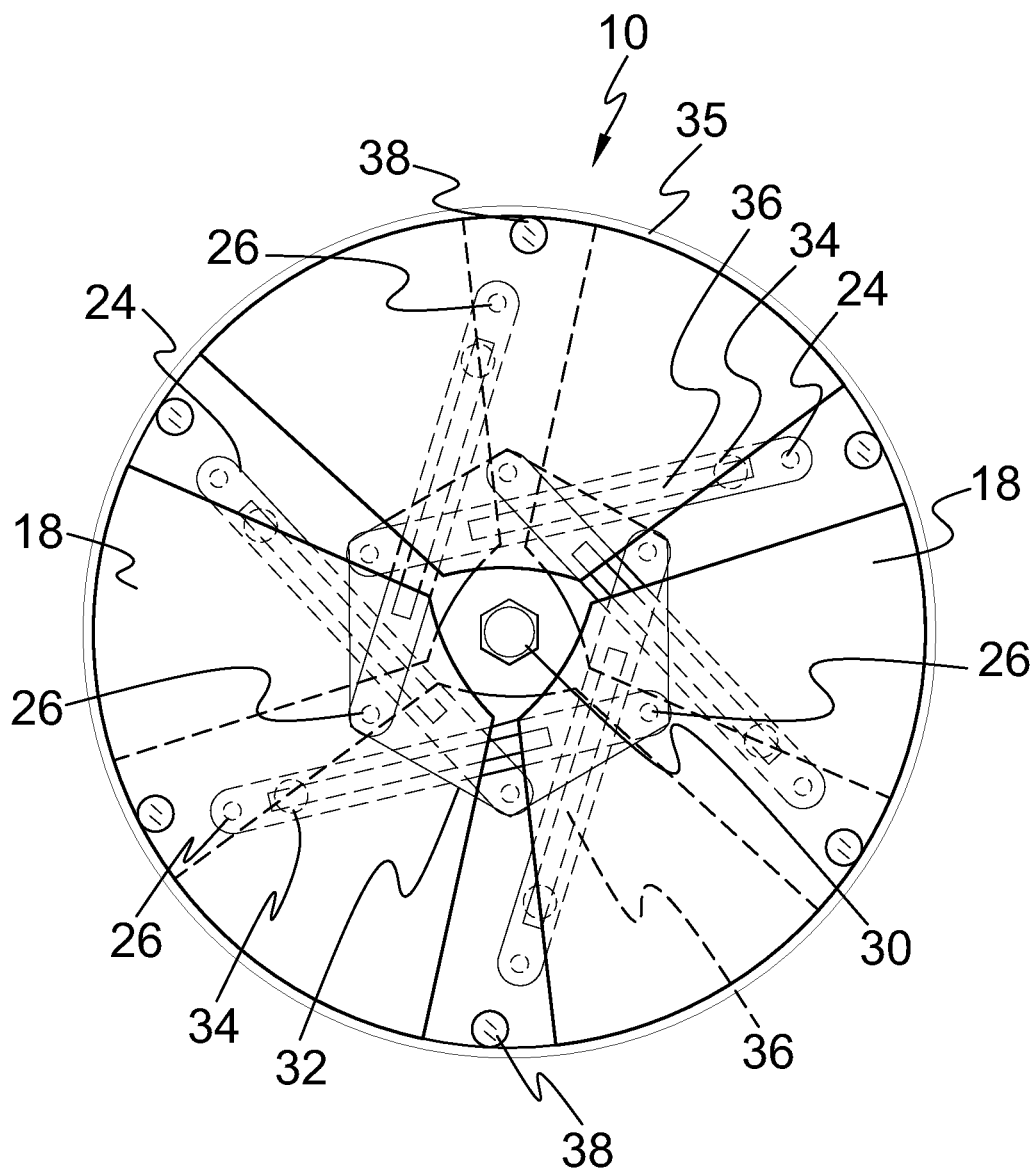
FIG. 5 is a bottom view of the cookware immersion device in the closed position.

Referring to FIG. 5, shown is a bottom view of the cookware immersion device in the closed position. The drive plate post 30 is fastened to the drive plate 32 having a plurality of drive plate linkages 24 having one end pivotally attached to the drive plate 32 and fixedly attached on the other end to a respective expansion plate 18, so that when the drive plate post 30 is rotated by the post handle 20, the drive plate 32 rotates extending the expansion plates 18 outwardly. Each of the drive plate linkages 24 has a longitudinal slot 36 with a guide pin 34 therein, that is fixedly attached to the base plate 35 constraining the expansion plate 18 in an outward extension.

Figure 6:
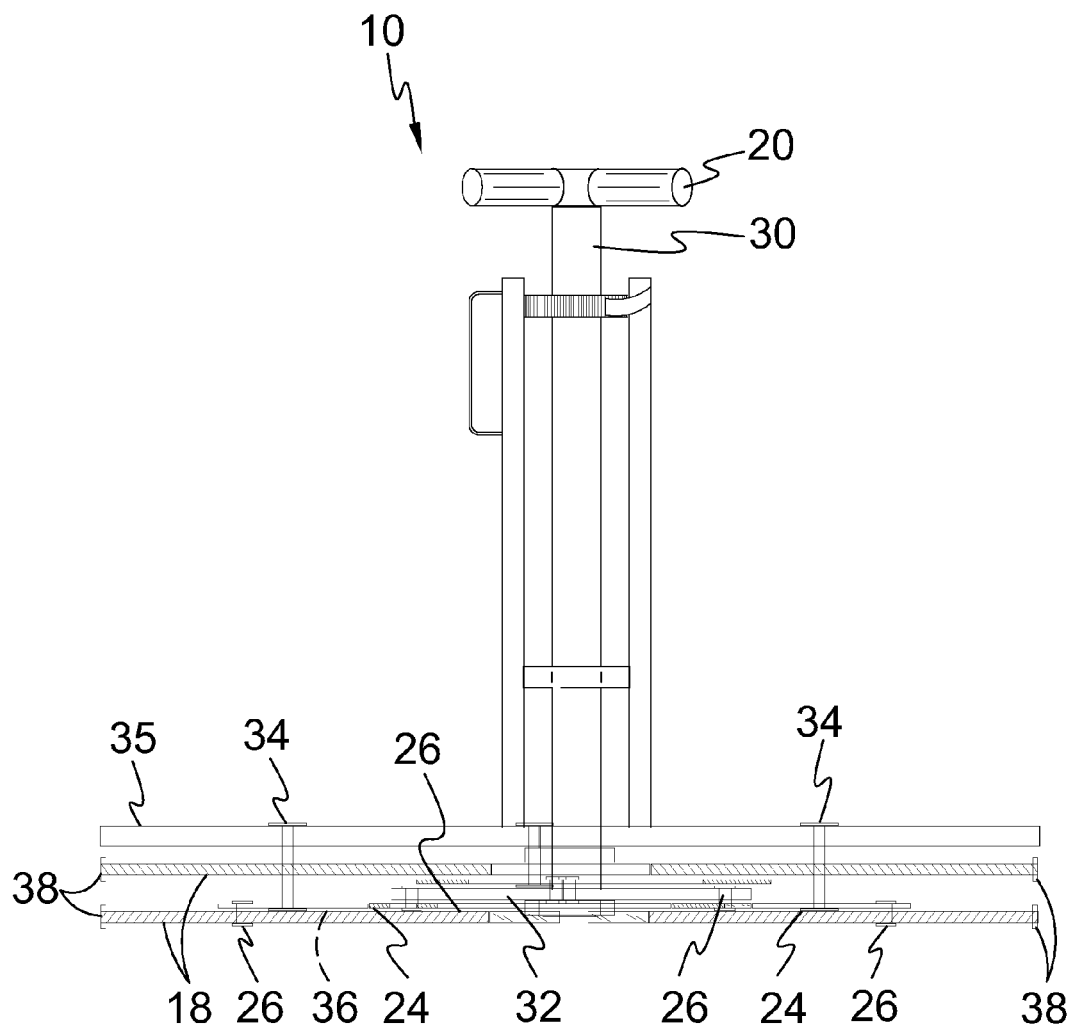
FIG. 6 is a front view of the cookware immersion device.

Referring to FIG. 6, shown is a front view of the cookware immersion device. The device 10 comprises a plurality of expansion plates 18 linked to a drive plate 32 fixedly attached to the drive plate post 30 terminating in the handle 20 for rotating the drive plate 32. Also shown is the drive plate post 30 having the gear 46 and latching mechanism 41 fastened to a base post 50 extending from the base plate 35 having guide pins 34 extending through a respective drive plate linkage 24 that is pivotally attached to the drive plate 32 on one end and fixedly attached to a respective expansion plate 18, so that rotation of the drive plate post 30 drives the expansion plate 18 outwardly along the linkage guide pin slot 36.

Figure 7:
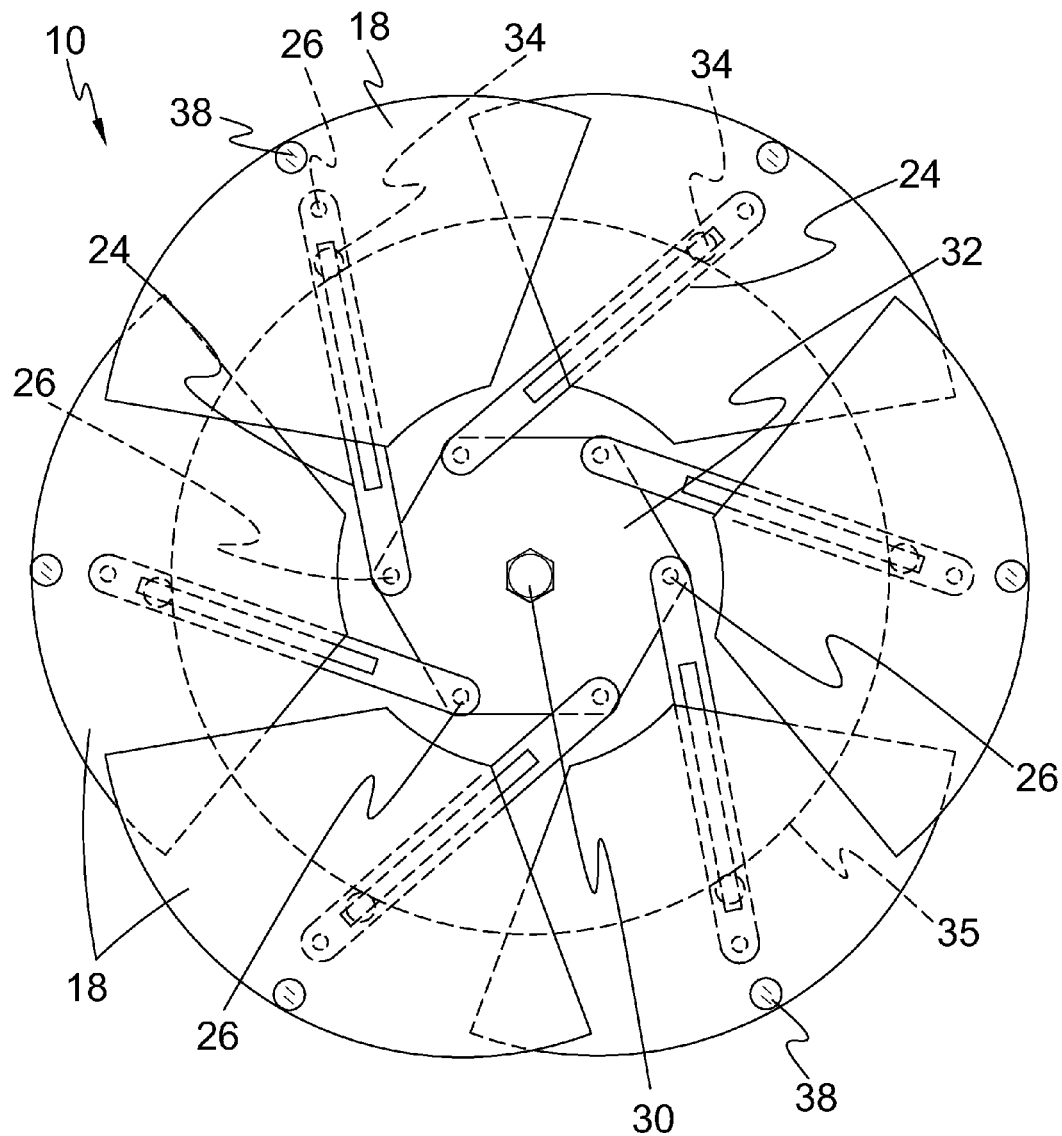
FIG. 7 is a bottom view of the cookware immersion device in the open position.

Referring to FIG. 7, shown is a bottom view of the cookware immersion device in the open position. The drive plate post 30 fastened to the drive plate 32 drives a plurality of drive plate linkages 24 having one end pivotally attached to the drive plate 32 and the other fixedly attached to a respective expansion plate 18, so that when the drive plate post 30 is rotated by the post handle 20, the drive plate 32 rotates extending the expansion plates 18 outwardly. Each of the drive plate linkages 24 has a longitudinal slot 36 with a guide pin 34 therein that is fixedly attached to the base plate 35 constraining the expansion plate 18 in an outward extension.

Figure 8:
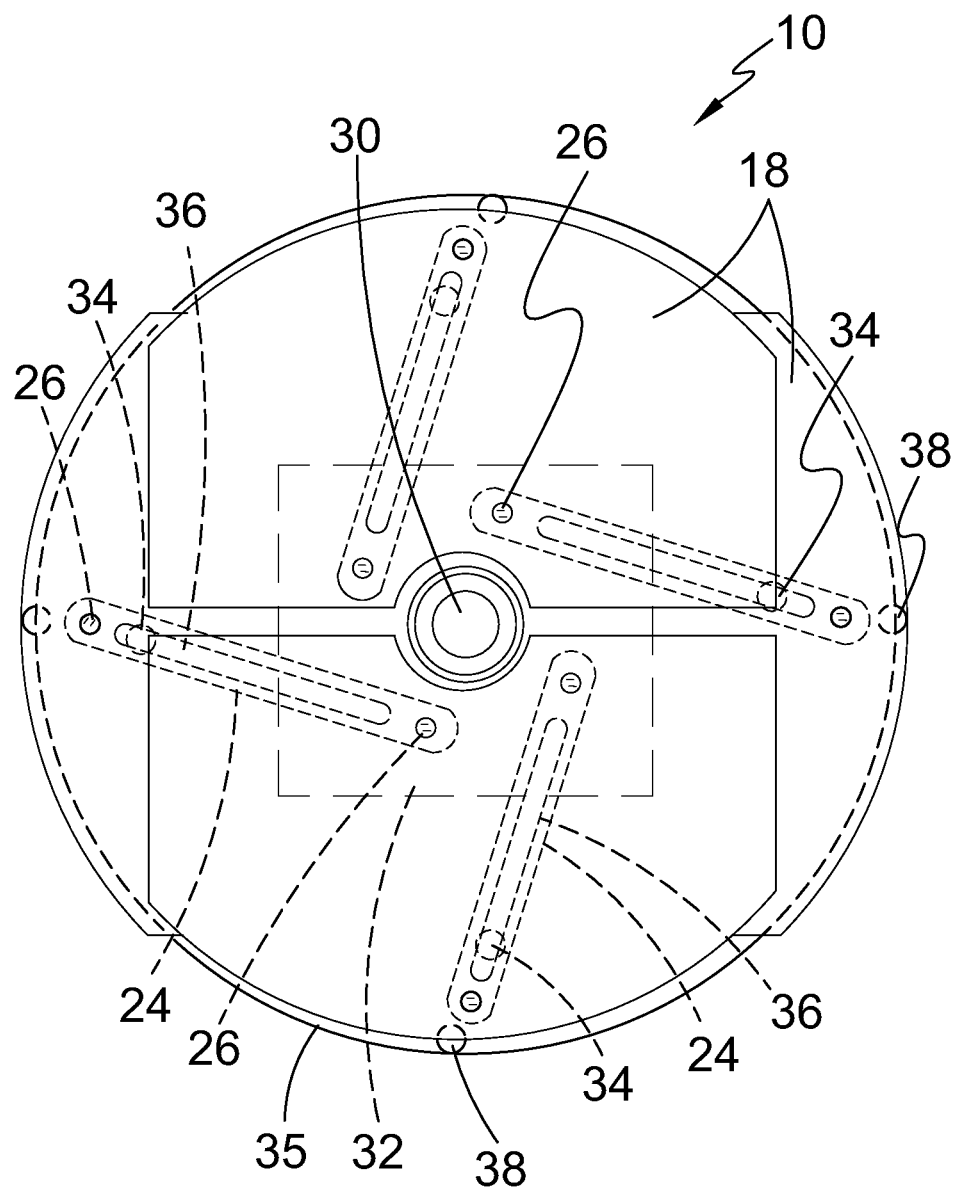
FIG. 8 is a bottom view of the cookware immersion device having four deployable expansion plates.

Referring to FIG. 8, shown is a bottom view of the cookware immersion device having four deployable expansion plates. The drive plate post 30 is fastened to the drive plate 32 having a plurality of drive plate linkages 24 having one end pivotally attached to the drive plate 32 and fixedly attached on the other end to a respective expansion plate 18, so that when the drive plate post 30 is rotated by the post handle 20, the drive plate 32 rotates extending the expansion plates 18 outwardly. Each of the drive plate linkages 24 has a longitudinal slot 36 with a guide pin 34 therein that is fixedly attached to the base plate 35 constraining the expansion plate 18 in an outward extension.

Figure 9:
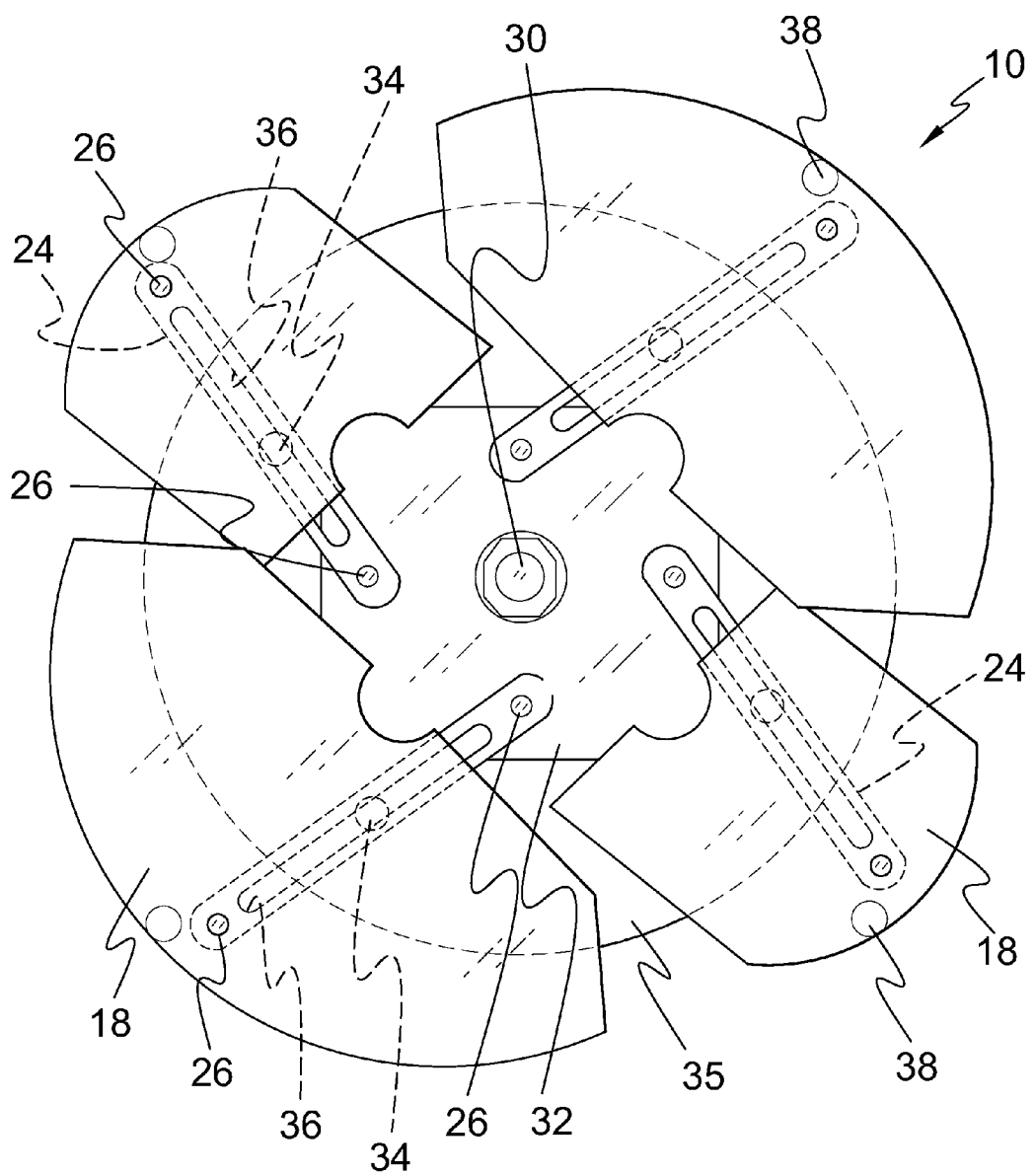
FIG. 9 is a bottom view of the cookware immersion device having four expansion plates deployed.

Referring to FIG. 9, shown is a bottom view of the cookware immersion device having four expansion plates deployed. The drive plate post 30 fastened to the drive plate 32 drives a plurality of drive plate linkages 34 having one end pivotally attached to the drive plate 32 and the other end fixedly attached to a respective expansion plate 18 so that when the drive plate post 30 is rotated by the post handle 20, the drive plate 32 rotates extending the expansion plates 18 outwardly. Each of the drive plate linkages 24 has a longitudinal slot 36 with a guide pin 34 therein that is fixedly attached to the base plate 34 constraining the expansion plate 18 in an outward extension.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A cookware immersion device used in conjunction with a cooking pot having an upstanding wall thereabout with an open top for receiving cooking liquid and food items therein, comprising:
    a structure inserted within the open top of the cooking pot for pressing the food items down within the cooking fluid;
    means for locking said structure in place against an inner surface of the upstanding wall of the cooking pot for retaining all of the food items within the cooking liquid in the cooking pot;
    a base plate having a plurality of apertures therethrough for allowing a portion of the cooking liquid to pass through the plurality of apertures;
    an upright shaft extending through a central area of said base plate;
    a plurality of posts spaced apart and mounted to said base plate about said upright shaft;
    a turn handle mounted to an upper end of said upright shaft;
    a drive plate mounted to a lower end of said upright shaft below said base plate, whereby when a user rotates said turn handle, said upright shaft will turn for causing said drive plate to also rotate;
    a plurality of flat linkage members, wherein each flat linkage member of said plurality of flat linkage members has a longitudinal slot;
    a plurality of expansion plates;
    a plurality of fasteners, wherein a portion of fasteners of said plurality of fasteners will retain inner ends of said plurality of flat linkage members in a pivotal manner for driving said drive plate, while a portion of said plurality of fasteners will retain outer ends of said plurality of flat linkage members in a stationary manner to said plurality of expansion plates;
    a plurality of guide pins, each guide pin of said plurality of guide pins mounted to an underside of said base plate and extending into one longitudinal slot in one said flat linkage member constraining an expansion plate outward extension; and,
    a plurality of alignment nubs, each alignment nub of said plurality of alignment nubs being mounted on a distal end of one said expansion plate, whereby when said expansion plates are extended, said plurality of alignment nubs will engage with said inner surface of said upstanding wall of the cooking pot.

2. The cookware immersion device used in conjunction with a cooking pot having an upstanding wall thereabout with an open top for receiving cooking liquid and food items therein according to claim 1, further comprising a latching mechanism between said upright shaft and one post of said plurality of posts for maintaining said expansion plates in an extended position and a retracted position.

3. The cookware immersion device used in conjunction with a cooking pot having an upstanding wall thereabout with an open top for receiving cooking liquid and food items therein according to claim 2, wherein said latching mechanism comprises:

a bearing retained in proximity to a lower end of said upright shaft and sized for rotating with said upright shaft about said plurality of posts;

a gear having teeth retained near an upper end of said upright shaft and sized for rotating with said upright shaft about said plurality of posts; and, a leaf spring having a fastened end connected to one said post of said plurality of posts and a free end for engaging with said teeth of said gear when said upright shaft is rotated in a clockwise direction, whereby when said leaf spring is depressed, the free end will disengage from said teeth of said gear for allowing said upright shaft to rotate in a counterclockwise direction.

4. The cookware immersion device used in conjunction with a cooking pot having an upstanding wall thereabout with an open top for receiving cooking liquid and food items therein according to claim 2, wherein said latching mechanism comprises:

a bearing retained in proximity to a lower end of said upright shaft and sized for rotating with said upright shaft about said plurality of posts;

a gear having teeth retained near an upper end of said upright shaft and sized for rotating with said upright shaft about said plurality of posts; and, a leaf spring having a fastened end connected to one said post of said plurality of posts and a free end for engaging with said teeth of said gear when said upright shaft is rotated in a counterclockwise direction, whereby when said leaf spring is depressed, the free end will disengage from said teeth of said gear for allowing said upright shaft to rotate in a clockwise direction.

5. The cookware immersion device used in conjunction with a cooking pot having an upstanding wall thereabout with an open top for receiving cooking liquid and food items therein according to claim 1, further comprising a hand grip mounted to a side of one said post of said plurality of posts proximate an upper end thereof, said hand grip for being gripped by a user to help guide said cookware immersion device into the cooking pot.

* * * * *